United States Patent
Kabe et al.

[11] Patent Number: 6,134,053
[45] Date of Patent: Oct. 17, 2000

[54] METHOD AND MECHANISM FOR DRIVING OPTICAL MEMBERS IN AN OPTICAL APPARATUS

[75] Inventors: Eiichi Kabe, Ohmiya; Yasunobu Sakaguchi; Tomonori Nishio, both of Kanagawa-ken, all of Japan

[73] Assignee: Fuji Photo Optical Co., Ltd., Japan

[21] Appl. No.: 09/240,908

[22] Filed: Jan. 29, 1999

[30] Foreign Application Priority Data

Jan. 30, 1998 [JP] Japan .................................. 10-034258
Jan. 7, 1999 [JP] Japan .................................. 11-001594

[51] Int. Cl.⁷ .................................................. G02B 15/14
[52] U.S. Cl. .......................................... 359/694; 359/700
[58] Field of Search ..................... 359/694, 699, 359/700; 396/79, 83, 170, 505–509

[56] References Cited

U.S. PATENT DOCUMENTS 5,212,598  5/1993  Kikuchi .................................... 359/823
5,436,684  7/1995  Hirasawa .................................. 396/83

*Primary Examiner*—Huy Mai
*Attorney, Agent, or Firm*—Price, Heneveld, Cooper, DeWitt & Litton

[57] ABSTRACT

A method and mechanism are disclosed for driving optical members in an optical apparatus, in which cam means formed on a lens barrel are provided with insensitive zones, so that the lens barrel is rotated to drive a diaphragm for adjustment of its diaphragm stop after the lens has been moved to the insensitive zones, then the lens barrel is rotated in the reverse direction with the diaphragm being maintained at its adjusted diaphragm stop, and thereby power variation and/or focussing of the lens as well as adjustment of the diaphragm stop are achieved using a single drive source. A cylindrical cam 40 is provided within a stationary lens barrel 30 so as to be rotatable around an optical axis S. The cylindrical cam 40 is formed with cam slits 41 each having insensitive zones 42 at longitudinally opposite ends thereof so that an enlarging lens 20 can not be further moved back and forth when lens driving pins 27 lie in these insensitive zones 42. Diaphragm driving plates 43, 44 are mounted on the inner wall of the cylindrical cam 40 so that rotation of the cylindrical cam 40 causes these diaphragm driving plates 43, 44 to drive the diaphragm driving pin 24 while the lens driving pins 27 lie in the insensitive zones 42 and thereby to vary a diaphragm stop of an iris diaphragm 22. Once the diaphragm stop has been varied, the cylindrical cam 40 is rotated in the reverse direction to move the enlarging lens 20 to a desired position for desired power variation and/or focussing.

48 Claims, 7 Drawing Sheets

Prior Art

METHOD AND MECHANISM FOR DRIVING OPTICAL MEMBERS IN AN OPTICAL APPARATUS

BACKGROUND OF THE INVENTION

This invention relates to a method and mechanism for driving optical members in an optical apparatus such as a camera, enlarger, printer, etc. and more particularly to such method and mechanism suitable for the purpose of moving a lens along an optical axis or adjusting a diaphragm stop.

Figure 7:
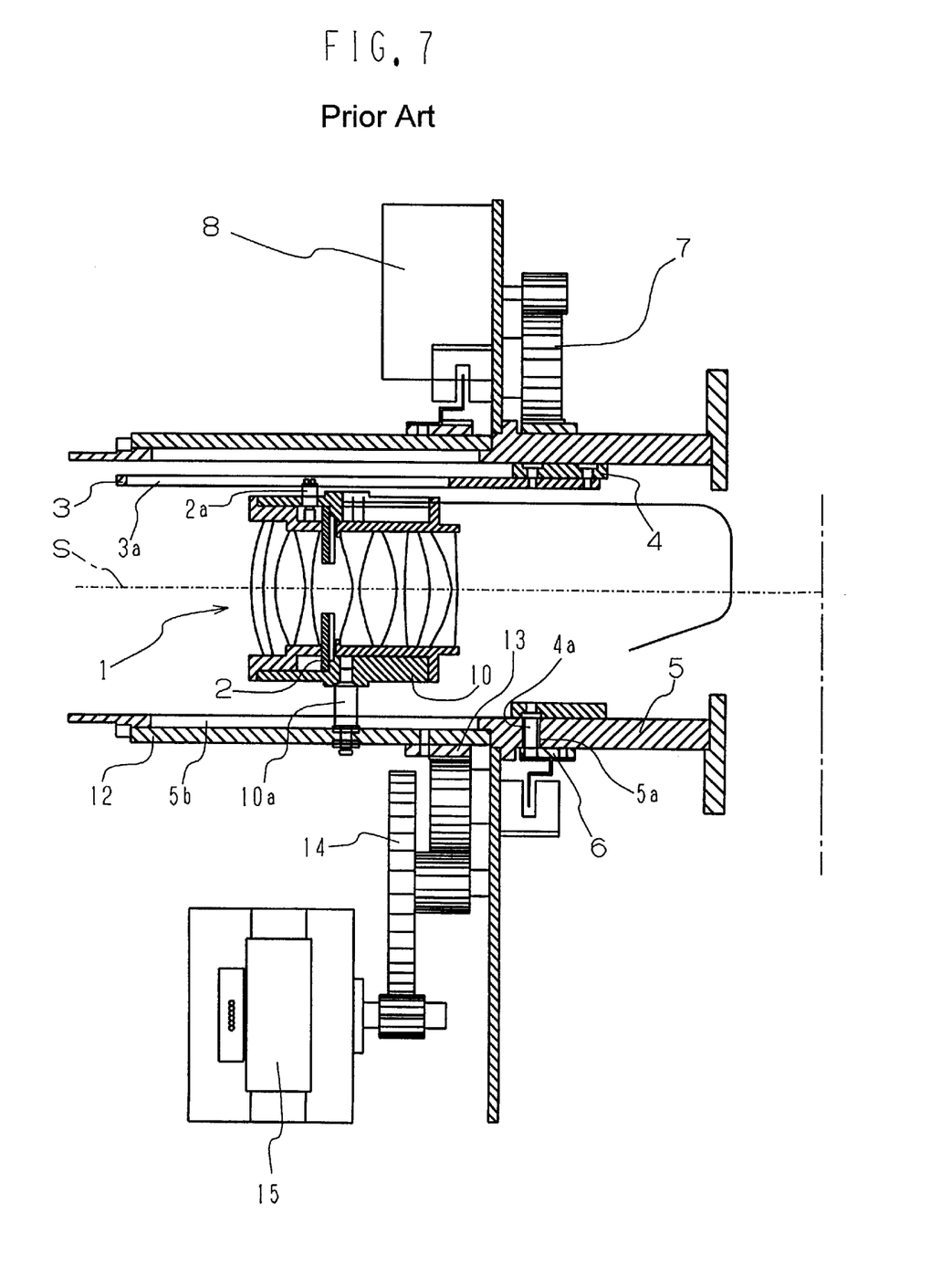
FIG. 7 is a view similar to FIG. 1, schematically showing a conventional mechanism adapted to drive an enlarging lens and a diaphragm in an optical enlarger.

FIG. 7 of the accompanying drawings is a sectional view schematically illustrating a construction of a conventional driving mechanism for an enlarging lens 1 and an iris diaphragm 2, both of which are important optical members constituting the optical enlarger in an automatic printer. Enlarging lens 1 is movable along its optical axis S for power variation or focussing. Iris diaphragm 2 lies midway between axially opposite ends of enlarging lens 1, so that iris diaphragm 2 may be driven in the direction of iris-in or iris-on as diaphragm pins 2a operatively associated with iris diaphragm 2 are rotated around the optical axis S.

There is provided a driving plate 3 extending in parallel to the optical axis S and formed with driving slits 3a, which have their longitudinal direction in parallel to the optical axis S. Diaphragm pins 2a of iris diaphragm 2 are normally in loose engagement with driving slits 3a. Driving plate 3 is fixed to an inner peripheral surface of an annular driving ring 4. Driving ring 4 is rotatable along an inner peripheral surface of a lens barrel 5 stationarily mounted on an apparatus frame and provided with a driving pin 4a mounted thereon. Driving pin 4a is oriented outward of driving ring 4 on one hand, and lens barrel 5 is partially formed with a slit 5a which extends circumferentially of lens barrel 5 on the other hand. Driving pin 4a is inserted into this slit 5a. An annular diaphragm driving gear 6 adapted to be rotated along an outer peripheral surface of lens barrel 5 is fixed to a distal end of driving pin 4a projecting outward beyond lens barrel 5. Diaphragm driving gear 6 is operatively associated via an appropriate gear train with an output shaft of a diaphragm driving motor 8, so that the output rotation of diaphragm driving motor 8 may be transmitted to diaphragm driving gear 6.

A lens driving pin 10a is provided on a lens mount 10 which holds, in turn, enlarging lens 1 and extends radially outward of mount 10. Lens barrel 5 is partially formed with a guide slit 5b having its longitudinal direction in parallel to the optical axis S, so that lens driving pin 10a may extend outward through guide slit 5b beyond lens barrel 5. A cylinder cam 12 adapted to be rotated around the optical axis S is provided on the outer peripheral surface of lens barrel 5. Cylinder cam 12 is formed with an appropriately configured cam slit into which a distal end of lens driving pin 10a is inserted. An annular end of cylinder cam 12 is provided with an annular lens driving gear 13 fixed thereto, so that said lens driving gear 13 may be operatively associated via an appropriate gear train 14 with an output shaft of a lens driving motor 15.

Upon actuation of lens driving motor 15, the output rotation thereof is transmitted via gear train 14 to lens driving gear 13, and thereby cylinder cam 12 is rotated around the optical axis S. Lens driving pin 10a, having its distal end inserted into the cam slit of cylinder cam 12, extends through guide slit 5b of lens barrel 5. Therefore, lens driving pin 10a is prevented from rotating around the optical axis S, and lens driving pin 10a is guided by the cam slit so as to move along the optical axis S. Since lens driving pin 10a is mounted to lens mount 10, enlarging lens 1, held by lens mount 10, may be moved back and forth along the optical axis S to achieve desired power variation or focussing.

Diaphragm pin 2a moves back and forth along driving slit 3a as enlarging lens 1 moves back and forth without operative dissociation between diaphragm pin 2a and driving plate 3. Upon actuation of diaphragm driving motor 8, the output rotation thereof is transmitted via gear train 7 to diaphragm driving gear 6 so that driving ring 4 operatively associated with diaphragm driving gear 6 is rotated around the optical axis S. Rotation of the driving ring 4 causes driving plate 3 and thereby diaphragm pin 2a also to be rotated around the optical axis S. As a result, iris diaphragm 2 is driven in the direction of iris-in or iris-out, depending on the direction in which diaphragm pin 2a is rotated.

The optical member driving mechanism of the prior art as described above includes two separately provided motors, i.e., lens driving motor 15 exclusively used to drive enlarging lens 1 and diaphragm driving motor 8 exclusively used to drive iris diaphragm 2. These two motors respectively used to drive two different optical members must be incorporated within one and the same optical apparatus, almost inevitably making the optical apparatus bulky. In addition, the respective motors each have parts operatively associated with the respective optical members. Consequently, the number of parts correspondingly increases and the construction is correspondingly complicated. Furthermore, the weight of the optical apparatus also increases. As a result, the degree of freedom to select a space for installation of the optical apparatus is liable to be limited by these factors.

SUMMARY OF THE INVENTION

In view of the problem as mentioned above, it is a principal object of the invention to provide a method and mechanism for driving a plurality of optical members in an optical apparatus using a single motor without an apprehension that the optical apparatus might be bulky and/or complicated.

The object set forth above is achieved, according to a first aspect of the invention, by a method for driving a lens and a diaphragm in an optical apparatus to achieve a desired power variation and/or focussing as well as a desired adjustment of diaphragm stop by moving the lens back and forth along an optical axis to obtain a desired amount of light, characterized by that both forward and backward movement of the lens and adjustment of the diaphragm stop are achieved using a single drive source. According to a second aspect of the invention, the object set forth above is achieved by a mechanism for driving optical members in an optical apparatus including a lens adapted to be moved back and forth by the mechanism for power variation and/or focussing and a diaphragm adapted to be driven by the mechanism for adjustment of its diaphragm stop, comprising a single drive source adapted to supply a drive force necessary to move the lens back and forth and to adjust a diaphragm stop of the diaphragm.

The single drive source such as a driving motor adapted to achieve forward and backward movement of the lens as well as adjustment of the diaphragm stop is advantageous to make the optical apparatus compact.

The invention also proposes a method for driving a lens and a diaphragm in an optical apparatus to achieve desired power variation and/or focussing as well as a desired adjustment of the diaphragm stop by moving the lens back and forth along an optical axis to obtain a desired amount of light, characterized by that a drive force from a single drive source is alternately switched between drive force transmission means for the lens and drive force transmission means for the diaphragm so as to move the lens back and forth and to adjust a diaphragm stop of the diaphragm. According to this aspect of the present invention, a mechanism for driving optical members in an optical apparatus, including a lens adapted to be moved back and forth by the mechanism for power variation and/or focussing and a diaphragm adapted to be driven by the mechanism for adjustment of its diaphragm stop, comprises a single drive source, drive force transmission means for the lens, and drive force transmission means for the diaphragm, wherein transmission of a drive force is switched with appropriate timing between the drive force transmission for the lens and the drive force transmission for the diaphragm to move the lens back and forth and to adjust a diaphragm stop of the diaphragm, respectively.

The lens is moved back and forth independently of the diaphragm when a drive force is transmitted from the drive source to the drive force transmission means for the lens, and the diaphragm stop is adjusted independently of the lens when a drive force is transmitted to the drive force transmission means for the diaphragm. By switching the path of the drive force transmission with appropriate timing, the diaphragm can be adjusted to a desired diaphragm stop and the lens can be moved back and forth to achieve desired power variation and/or focussing.

The invention also proposes a method and a mechanism for driving optical members in an optical apparatus, wherein the diaphragm is adjusted to a desired diaphragm stop after the lens has been moved back and forth to a desired position.

For example, the drive force transmission means for the lens may be connected to the drive source to transmit a drive force from the drive source to the lens via the drive force transmission means for the lens and thereby to move the lens back and forth to a desired position. Thereafter the drive force transmission means for the diaphragm may be connected to the drive source to transmit a drive force to the diaphragm and thereby to adjust the diaphragm to a desired diaphragm stop.

The invention also proposes a method and a mechanism for driving optical members in an optical apparatus, wherein the lens is moved back and forth to a desired position after the diaphragm has been adjusted to a desired diaphragm stop.

For example, the drive force transmission for the diaphragm may be connected to the drive source to transmit a drive force from the drive source to the diaphragm via the drive force transmission means for the diaphragm and thereby to adjust the diaphragm to a desired diaphragm stop. Thereafter, the drive force transmission means for the lens may be connected to the drive source to transmit a drive force to the lens and thereby to move the lens back and forth to a desired position.

The invention further proposes a method and a mechanism for driving optical members in an optical apparatus, wherein the diaphragm is adjusted to a desired diaphragm stop while the lens is moved back and forth to a desired position.

By simultaneously achieving backward or forward movement of the lens and adjustment of diaphragm stop, the optical apparatus can be rapidly prepared for photographing, enlarging, or printing.

The invention additionally proposes a method for driving a lens and a diaphragm in an optical apparatus to achieve a desired power variation and/or focussing as well as a desired adjustment of the diaphragm by moving the lens back and forth along an optical axis to obtain a desired amount of light, comprising the steps of transmitting a drive force from a drive source to the lens via drive force transmission means, arranging the diaphragm so as to be temporarily engageable with the drive force transmission means adapted to transmit a drive force to the lens, intercepting transmission of a drive force from the drive force transmission means to the lens when the diaphragm comes in engagement with the drive force transmission means in the course of driving the lens, thereby driving the diaphragm until a diaphragm stop thereof is adjusted to a desired value, and disengaging the diaphragm from the drive force transmission means so that a drive force may be transmitted again to the lens and thereby the lens may be driven to a desired position.

Specifically, in the course of driving the lens back and forth along the optical axis by driving the drive force transmission means, transmission of a drive force to the lens is intercepted and thereupon the drive force transmission means comes in engagement with the diaphragm so that a drive force may be transmitted to the diaphragm which is then adjusted to a desired diaphragm stop. Once the diaphragm has been adjusted to a desired diaphragm stop, the drive force transmission means is disengaged from the diaphragm and a drive force is transmitted again to the lens so that the lens may be driven to a desired position for desired power variation and/or focussing.

Successively driving the lens and the diaphragm can be achieved by a single drive force such as a motor, and such feature of the invention contributes to realization of a compact and lightweight optical apparatus.

The invention further proposes a specific method for driving a lens and a diaphragm in an optical apparatus to achieve a desired power variation and/or focussing as well as a desired adjustment of the diaphragm to obtain a desired amount of light, comprising the steps of rotating a driving lens barrel by transmitting a drive force to the driving lens barrel from a drive source, moving the lens back and forth along an optical axis and adjusting a diaphragm stop of the diaphragm by rotation of the driving lens barrel, intercepting transmission of a drive force to the lens after the lens has been moved to a predetermined position by rotation of the driving lens barrel and then switching transmission of a drive force from the driving lens barrel to the diaphragm, and rotating the driving lens barrel in the reverse direction after the diaphragm has been adjusted to a desired diaphragm stop and thereby moving the lens in the reverse direction until the lens is driven to a desired position.

Rotation of the driving lens barrel causes the lens to be moved back and forth depending on the direction in which the driving lens barrel rotates until the lens is driven to an appropriate position, whereupon transmission of a drive force to the lens is intercepted so that the lens can no more move even if the driving lens barrel continues to be rotated. From this state, the diaphragm is adjusted to a desired diaphragm stop by rotation of the lens. Once the diaphragm has been adjusted to a desired diaphragm stop, the driving lens barrel is rotated in the reverse direction. Upon rotation of the driving lens barrel in the reverse direction, transmission of a drive force to the diaphragm is intercepted and the diaphragm is maintained at the adjusted diaphragm stop. Simultaneously, such rotation of the driving lens barrel in the reverse direction is transmitted to the lens, which is then moved in the reverse direction to a desired position for desired power variation and/or focussing.

The invention also proposes a method and a mechanism for driving optical members in an optical apparatus wherein there are provided position-maintaining means adapted to maintain the lens or diaphragm at their desired positions, so that one of the lens and diaphragm can be maintained at its desired position even when the other is driven after the one has been driven to the desired position.

For example, there is a case in which the lens is moved back and forth to a desired position after the diaphragm has been adjusted to a desired diaphragm stop. In this case, the diaphragm stop may be affected by vibration or the like due to forward or backward movement of the lens. Such a result can be avoided by the provision of said position-maintaining means.

When it is desired to provide the driving mechanism of the invention with the position-maintaining means, friction members or the like are operatively associated with the drive force transmission means for the lens or the diaphragm so that these drive force transmission means should operate against a frictional force generated between these drive force transmission means and the friction members. In this way, there is no apprehension that these drive force transmission means might unintentionally operate, unless a drive force is transmitted to these drive force transmission means.

The invention additionally proposes a mechanism for driving optical members in an optical apparatus including a lens adapted to be moved back and forth by the mechanism for power variation and/or focussing and a diaphragm adapted to be driven by the mechanism for adjustment of its diaphragm stop, comprising a drive source supplying a drive force to the lens and diaphragm, drive force transmission adapted to transmit a drive force from the drive source to the lens, clutch means mounted on the drive force transmission means so as to be temporarily engageable with the diaphragm, the clutch means being in engagement with the diaphragm to drive the diaphragm, the clutch means being engaged with the diaphragm when the lens has been driven to a predetermined position and the clutch means being out of engagement with the diaphragm unless the lens lies at the predetermined position, and transmission of a drive force from the drive force transmission means to the lens being intercepted when the clutch means is in engagement with the diaphragm.

When the lens has been driven to a predetermined position, the clutch means is engaged with the diaphragm and transmission of a drive force to the lens is intercepted. As a result, the diaphragm is driven by a drive force transmitted thereto from the drive source via the drive force transmission means to a desired diaphragm stop. Once the diaphragm has been driven to a desired diaphragm stop, the lens is rotated in the reverse direction and thereby the lens leaves the predetermined position. Such movement of the lens disengages the clutch means from the diaphragm, and thereafter the latter can no longer be driven. Thus, the diaphragm is maintained at the adjusted diaphragm stop. The lens, on the other hand, is moved in the reverse direction to a desired position for desired power variation and/or focussing.

The invention also proposes a specific mechanism for driving optical members in an optical apparatus including a lens adapted to be moved back and forth by the mechanism for power variation and/or focussing and a diaphragm adapted to be driven by the mechanism for adjustment of its diaphragm stop, comprising a lens barrel containing therein the lens and the diaphragm being moved back and forth together with the lens, a driving lens barrel provided within the lens barrel so as to be rotatable around an optical axis, clutch means mounted on the inner peripheral wall of the driving lens barrel at appropriate positions so that the clutch means may be temporarily engaged with or disengaged from drive input means for the diaphragm as the driving lens barrel is rotated, cam slits formed on the driving lens barrel so as to be operatively associated with the drive input means for the lens, cam means provided on the lens barrel so as to be operatively associated with the drive input means for the lens, and a drive source for rotating the driving lens barrel, wherein the cam slits and the cam means are appropriately configured so that the lens may be moved back and forth along an optical axis over a predetermined distance as the driving lens barrel is rotated, and the cam slits are provided on their appropriate locations with insensitive zones in which the lens is not moved back and forth even if the driving lens barrel continues to be rotated, so that the clutch means may come into engagement with the drive input means for the diaphragm to drive the diaphragm in the direction of iris-in or iris-out when the drive input means for the lens lies in the insensitive zones.

Rotation of the driving lens barrel causes the lens to be moved back and forth along the optical axis depending on the direction in which the driving lens barrel rotates. The drive input means for the lens is regulated by the cam slits and the cam means to move over a predetermined extent. Upon arrival at the insensitive zones, the lens can no longer be moved forward even if the driving lens barrel continues to rotate. In the insensitive zones, the clutch means is engaged with the drive input means for the diaphragm and thereby the latter is driven in the direction of iris-in or iris-out. Once the diaphragm has been adjusted to a desired diaphragm stop, the driving lens barrel is rotated in the reverse direction. Rotation in this direction is not transmitted to the drive input means for the diaphragm, and therefore the diaphragm is maintained at the adjusted diaphragm stop. Rotation of the driving lens barrel in the reverse direction causes the drive input means for the lens to leave the insensitive zones and thereafter the lens is moved back under the regulation of the cam slits and the cam means. When the lens has been moved back to the position for desired power variation and/or focussing, a drive force to the driving lens barrel may be intercepted to achieve desired power variation and/or focussing as well as a desired diaphragm stop.

The invention proposes a mechanism for driving optical members in an optical apparatus wherein the insensitive zones are provided in the proximity of a forward movement limit for the lens as well as a backward movement limit for the lens.

The drive input means for the lens is operatively associated with the insensitive zones when the lens has been moved forward to its forward movement limit and consequently the lens can not be moved forward even if the driving lens barrel continues to rotate. Thus, the diaphragm adjustment starts. Once a desired diaphragm stop has been achieved, the driving lens barrel may be rotated in the direction to move the lens back and thereby the drive input means for the lens may be moved away from the insensitive zones. In this manner, the lens can be moved back to a desired position. The directions in which the diaphragm is driven in the insensitive zones at the forward movement limit and the backward movement limit are opposed to each other.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Details of the method and the mechanism according to the invention for driving a plurality of optical members in the associated optical apparatus will be more fully understood from the description of the preferred embodiments given hereunder in reference to the accompanying drawings. It should be understood that a specific case will be discussed herein, in which the optical apparatus is an optical enlarger or enlarger station in an automatic printer and the optical members are an enlarging lens and a diaphragm. More specifically, the case will be discussed in which the driving mechanism according to the invention is incorporated in the optical enlarger or enlarger station to move the enlarging lens back and forth along an optical axis thereof as well as to adjust the diaphragm stop.

Figure 1:
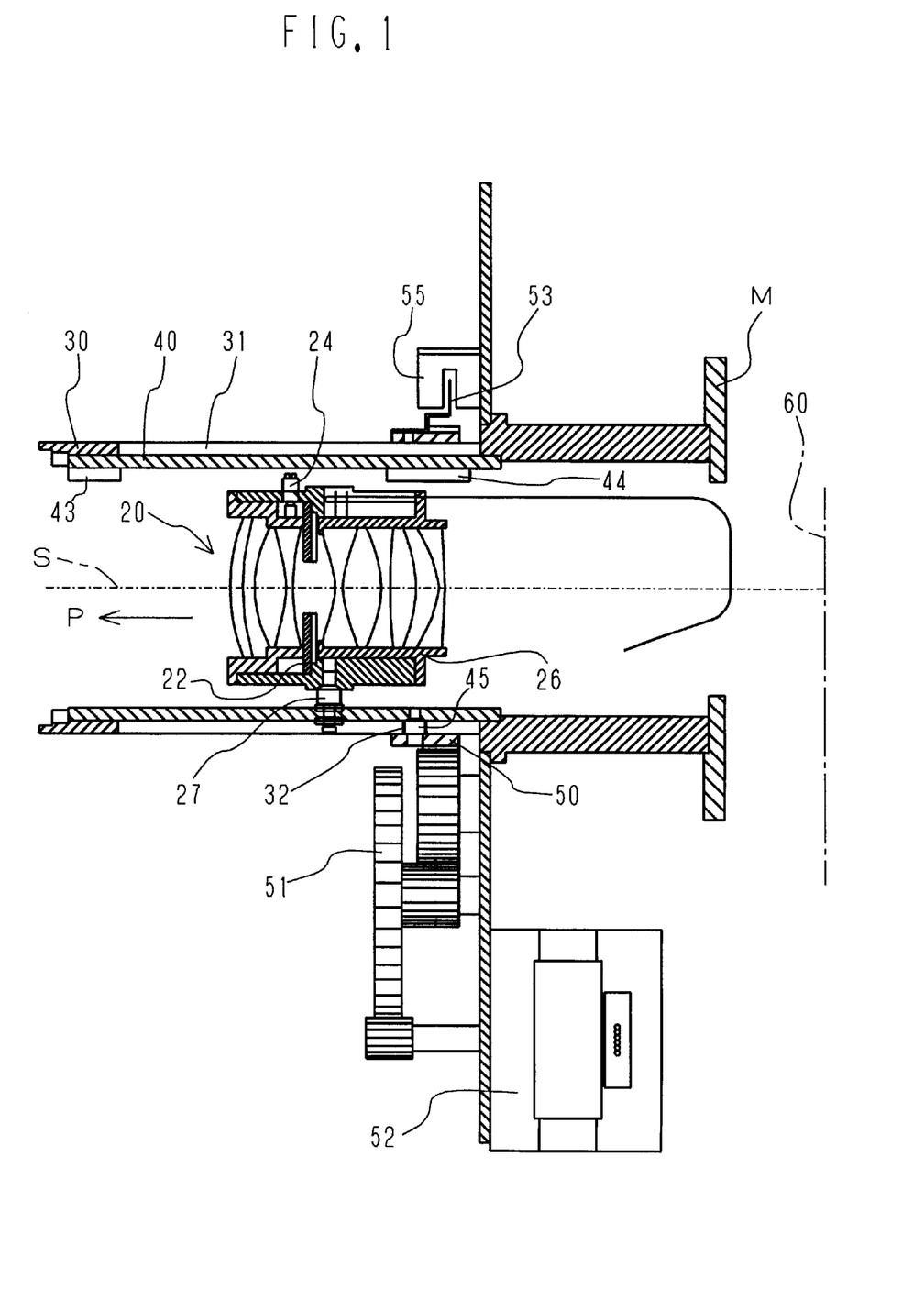
FIG. 1 is a composite sectional view taken along a plane including an optical axis of an optical enlarger incorporating a driving mechanism according to the invention, schematically showing said driving mechanism in combination with said enlarger.

FIG. 1 is a composite sectional view taken along a plane including the optical axis S schematically illustrating an enlarging lens 20 and a mechanism located substantially midway of enlarging lens 20 to drive an iris diaphragm 22, both being components of the automatic printer. As will be apparent from FIG. 2, iris diaphragm 22 is of the well-known type comprising an appropriate number of diaphragm blades 23, so that iris diaphragm 22 may be driven in the direction of iris-in or iris-out as diaphragm driving pin 24 associated with the respective diaphragm blades 23 and functioning as a drive input for each of diaphragm blades 23 is moved around the optical axis S.

Figure 3:
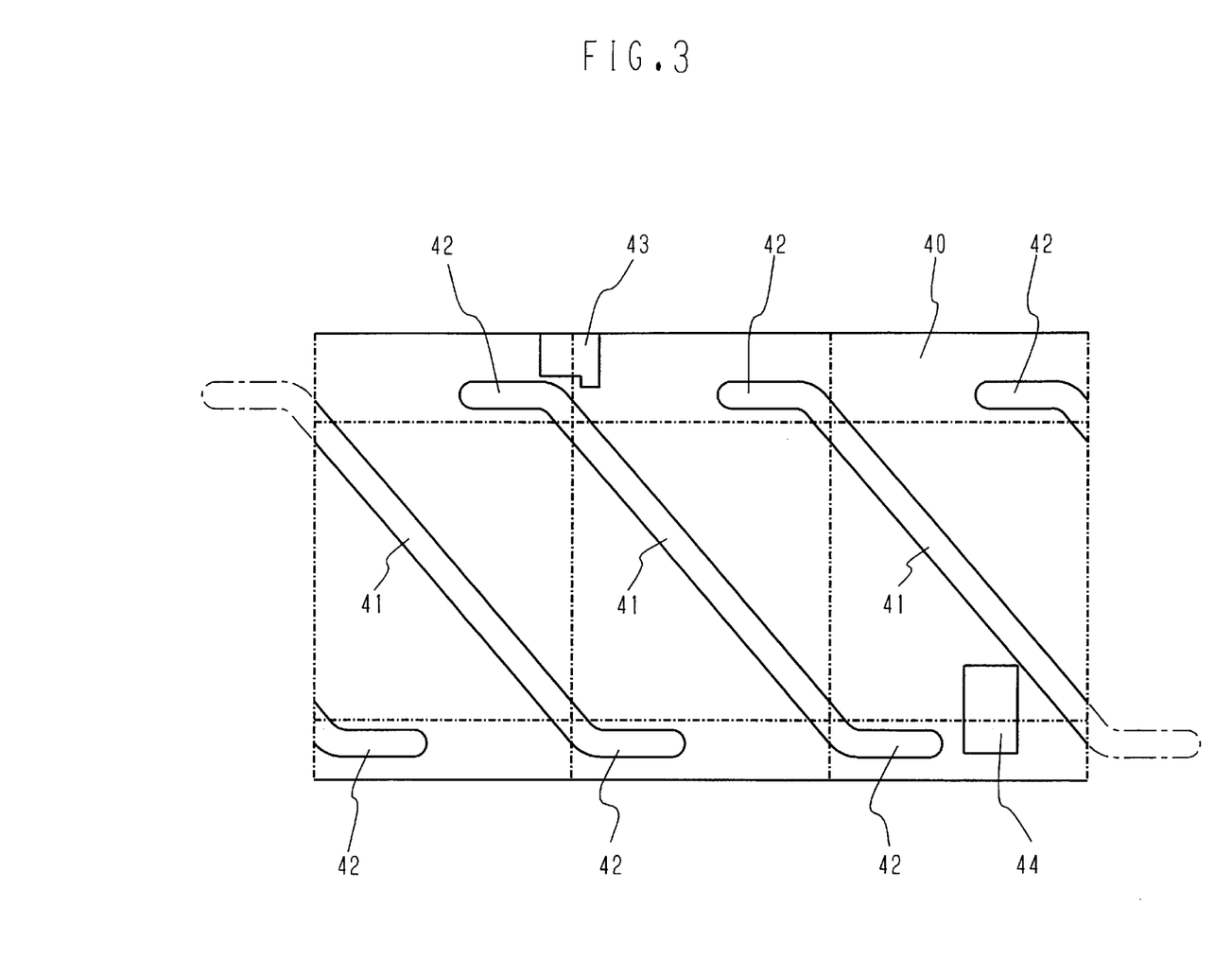
FIG. 3 is a developed view of a cylindrical cam.

Enlarging lens 20 and iris diaphragm 22 are housed within a stationary lens barrel 30 which is, in turn, fixed to a basic body M of the optical enlarger. Stationary lens barrel 30 is formed with guide slits 31 having their longitudinal directions in parallel to the optical axis S and functioning as cam slits. Stationary lens barrel 30 further contains therein a power transmitting means in the form of a cylindrical cam 40, which is rotatable around the optical axis S and functions as a driving lens barrel. The cylindrical cam 40 is formed, as will be apparent from FIG. 3 showing cylindrical cam 40 in its developed view, with a plurality of cam slits 41 each having an appropriate length and extending at an appropriate angle with respect to the optical axis S. Each of cam slits 41 is formed at its longitudinally opposite ends with insensitive zones 42 each extending circumferentially of cylindrical cam 40.

A lens mount 26 holding enlarging lens 20 has lens driving pins 27 mounted thereon, each of them extending outward from lens mount 26 and functioning as a drive input for lens 20. Lens driving pins 27 are inserted into respective cam slits 41 and further into respective guide slits 31. In this embodiment, three cam slits 41 cooperate with three driving pins 27, respectively.

Figure 2:
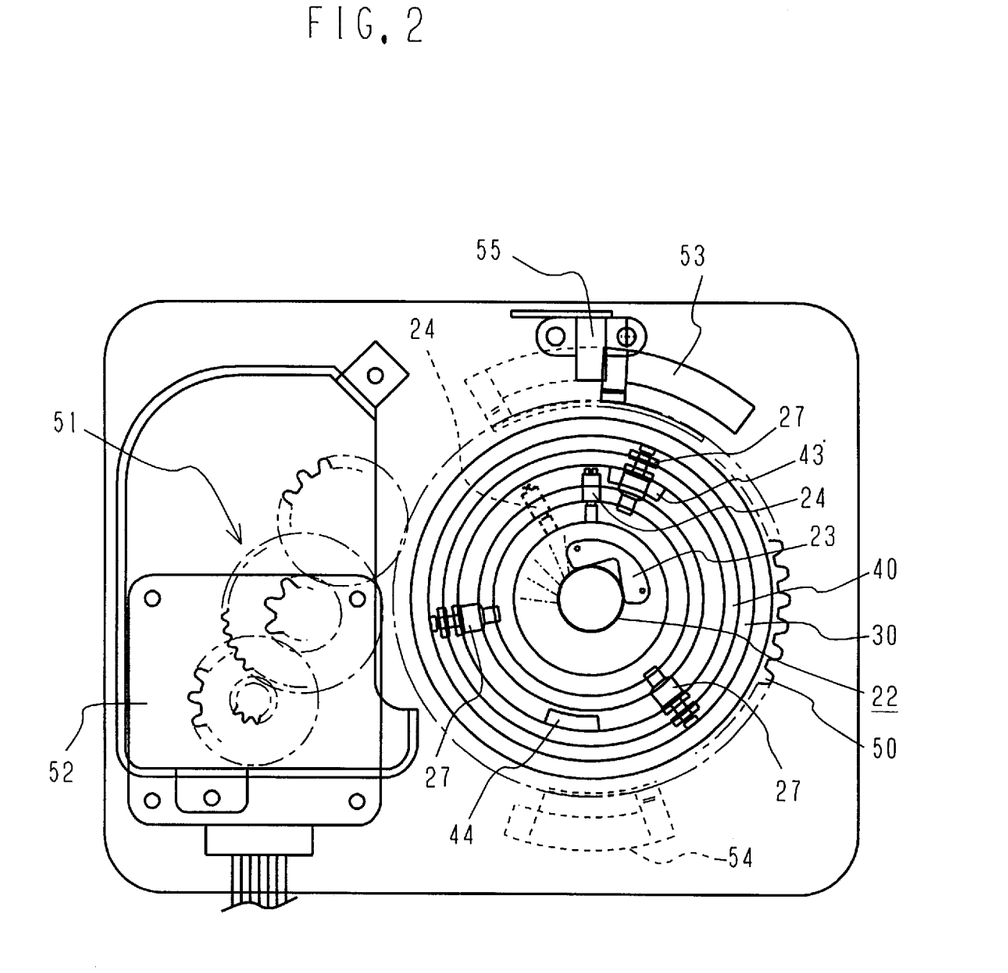
FIG. 2 is a front view schematically showing the driving mechanism incorporated in the enlarger.
Figure 4:
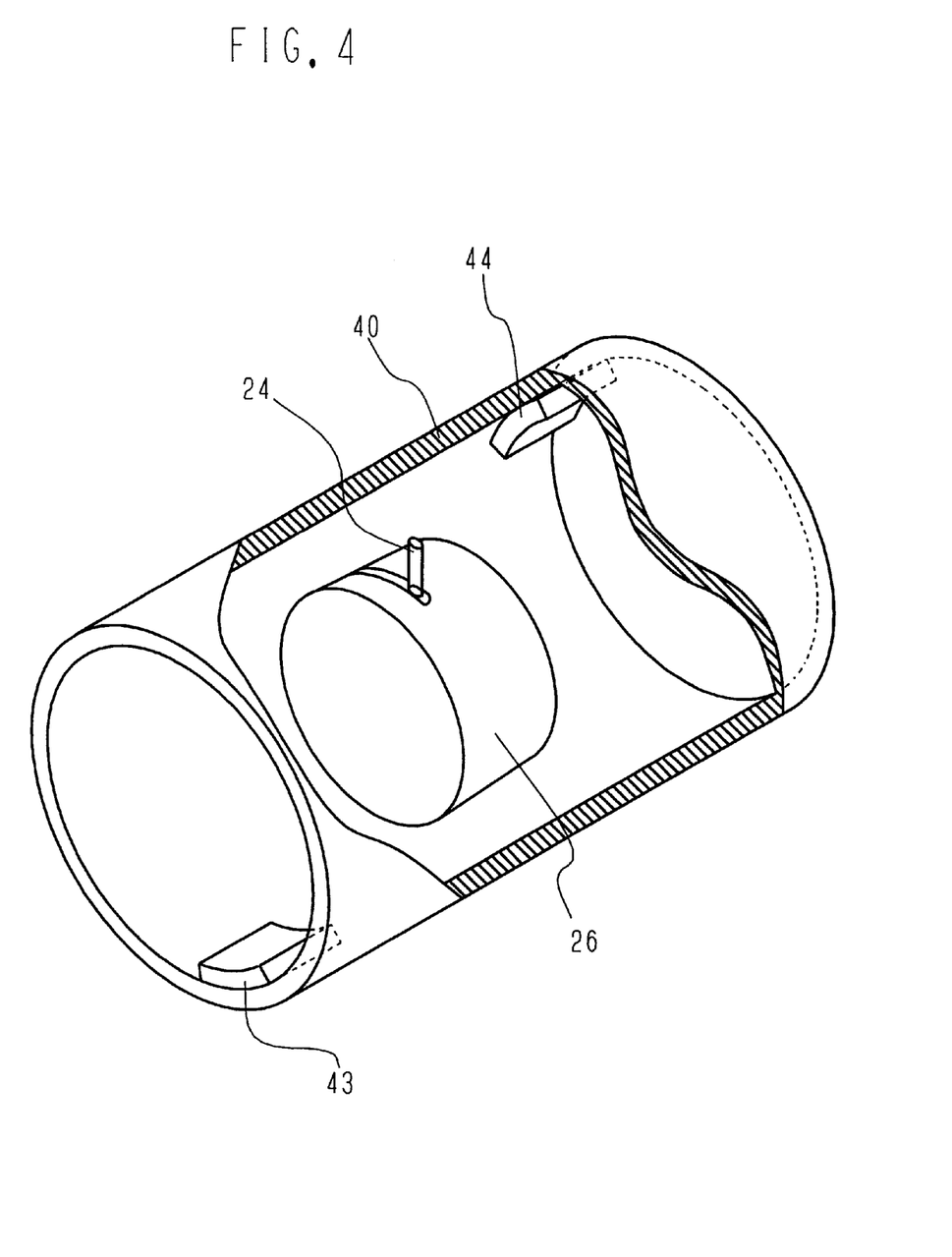
FIG. 4 is a schematic perspective view illustrating the relative position of the cylindrical cam to a lens mount for an enlarging lens, a diaphragm driving pin, and a diaphragm driving plate.

Diaphragm driving plates 43, 44 are provided on an inner surface of cylindrical cam 40 so that diaphragm driving pin 24 may come into engagement with one of diaphragm driving plates 43, 44 as lens driving pins 27 arrive at insensitive zones 42, respectively. As shown in FIGS. 2–4, these diaphragm driving plates 43, 44 are located at an angular distance from each other, approximately of 180°. A link pin 45 extends outward from a part of cylindrical cam 40. A link slit 32 having an appropriate length circumferentially of stationary lens barrel 30 is provided at a part of stationary lens barrel 30 corresponding to the part of cylindrical cam 40. Link pin 45 extends through link slit 32 outward beyond stationary lens barrel 30, and a distal end thereof integrally carries an annular driving gear 50 so that driving gear 50 may be rotated in synchronization with cylindrical cam 40 relative to stationary lens barrel 30 around the optical axis S.

Output rotation of a pulse motor 52 serving as a drive source is transmitted via an appropriate gear train to driving gear 50. Detector tongues 53, 54 are fixed to driving gear 50 on its outer peripheral surface at positions corresponding to the positions of diaphragm driving plates 43, 44, respectively, and the basic body M of the apparatus is provided with a tongue-detecting station 55 adapted to receive detector tongues 53, 54 and thereby to detect the presence of detector tongues 53, 54.

It should be understood that reference numeral 60 in FIG. 1 designates a plane of photosensitive material placed on a mount board (not shown) and this mount board may be moved along the optical axis S to adjust its position relative to enlarging lens 20.

The embodiment of the novel mechanism constructed as described above operates in the manner described below.

Upon actuation of motor 52, the output rotation thereof is transmitted to driving gear 50, which is then rotated around the optical axis S. Cylindrical cam 40 is connected by link pin 45 to driving gear 50 and therefore cylindrical cam 40 is rotated in the same direction as driving gear 50. Lens driving pins 27 are inserted into the respective cam slits 41 of the cylindrical cam 40 and also inserted into the guide slits 31 of the stationary lens barrel 30 which extend in parallel to the optical axis S. Such unique arrangement allows lens mount 26 supporting the lens driving pins 27 to move together with enlarging lens 20 back and forth along the optical axis S as cylindrical cam 40 is rotated.

Output rotation of motor 52 in the reverse direction causes lens mount 26 to move together with enlarging lens 20 in the direction as indicated by an arrow P in FIG. 1. Lens driving pins 27 arrive at respective insensitive zones 42 of cam slits 41 as lens driving pins 27 move back along respective cam slits 41 beyond their backward movement limits. With lens driving pins 27 lying in the respective insensitive zones 42, positions of lens driving pins 27 along the optical axis S do not change even if cylindrical cam 40 is further rotated, thus lens mount 26 and enlarging lens 20 remain at their backward movement limits. With lens mount 26 lying at its backward movement limit, diaphragm driving plate 43 mounted on the inner wall of cylindrical cam 40 is in engagement with driving pin 24 for iris diaphragm 22, which has moved back together with lens mount 26. Further output rotation of motor 52 in a reverse direction causes cylindrical cam 40 to rotate integrally with diaphragm driving plate 43 so as to drive diaphragm driving pin 24. As a result, diaphragm blades 23 are driven, and thereby the diaphragm stop of iris diaphragm 22 is varied. As more specifically described with reference to FIG. 2, diaphragm driving plate 43 engages diaphragm driving pin 24 and then drives the latter counterclockwise from its position as indicated by a solid line to its position as indicated by a dashed line. In this manner, the diaphragm stop of iris diaphragm 22 is varied.

After iris diaphragm 22 has been adjusted to a desired diaphragm stop, motor 52 is deenergized and then energized again, but in the forward direction. Rotation of motor 52 in the forward direction is transmitted to cylindrical cam 40, which is then rotated in the direction opposed to the direction in which cylindrical cam 40 has been rotated so as to move enlarging lens 20 forward, i.e., in the direction opposite the direction indicated by the arrow P. Upon this reverse rotation of cylindrical cam 40, diaphragm driving plate 43 is also rotated together with cylindrical cam 40 and disengaged from diaphragm driving pin 24, maintaining iris diaphragm 22 at its adjusted diaphragm stop. Now enlarging lens 20 is moved forward to an appropriate position and thereby, in addition to the desired adjustment of iris diaphragm 22, desired power variation and focussing are achieved. In this way, the optical enlarger is ready for operation of optical enlarging.

When it is desired to vary a diaphragm stop of iris diaphragm 22, motor 52 is rotated in its forward direction and thereby lens mount 26 is moved forward, i.e., in the direction opposite to the direction indicated by the arrow P. Lens driving pins 27 arrive at the respective insensitive zones 42 as lens mount 26 arrives at its forward movement limit. Thereupon, rotation of cylindrical cam 40 can no longer move lens mount 26 forward, and diaphragm driving plate 44 adapted to rotate integrally with cylindrical cam 40 drives diaphragm driving pin 24 in the direction opposite the direction in which diaphragm driving pin 24 has been driven at the backward movement limit. As a result, diaphragm blades 23 of iris diaphragm 22 are driven in the direction opposite the direction in which they have been driven at the backward movement limit. Specifically with reference to FIG. 2, diaphragm driving plate 44 is engaged the diaphragm driving pin 24 lying at the position as indicated by the dashed line and then drives diaphragm driving pin 24 clockwise from the position as indicated by the dashed line to the position as indicated by the solid line.

For example, an arrangement is assumed, according to which iris diaphragm 22 has its diaphragm stop varied in the direction of iris-in at the forward movement limit and in the direction of iris-out at the backward movement limit. With such arrangement, after iris diaphragm 22 has its diaphragm stop changed to a higher value at the forward movement limit, motor 52 is energized to rotate in the reverse direction until lens mount 26 arrives at the backward movement limit at which iris diaphragm 22 is then adjusted to a desired diaphragm stop. Thereupon, motor 52 is energized to rotate in the forward direction until enlarging lens 20 moves forward to a desired position. In this way, iris diaphragm 22 has been adjusted to a desired diaphragm stop, and now desired power variation or focussing is achieved, so that the optical enlarger is ready for operation of optical enlarging.

At the forward and backward movement limits for enlarging lens 20, any one of detector tongues 53, 54 is detected by tongue-detecting station 55, and thereby the position of enlarging lens 20 is detected.

Figure 5:
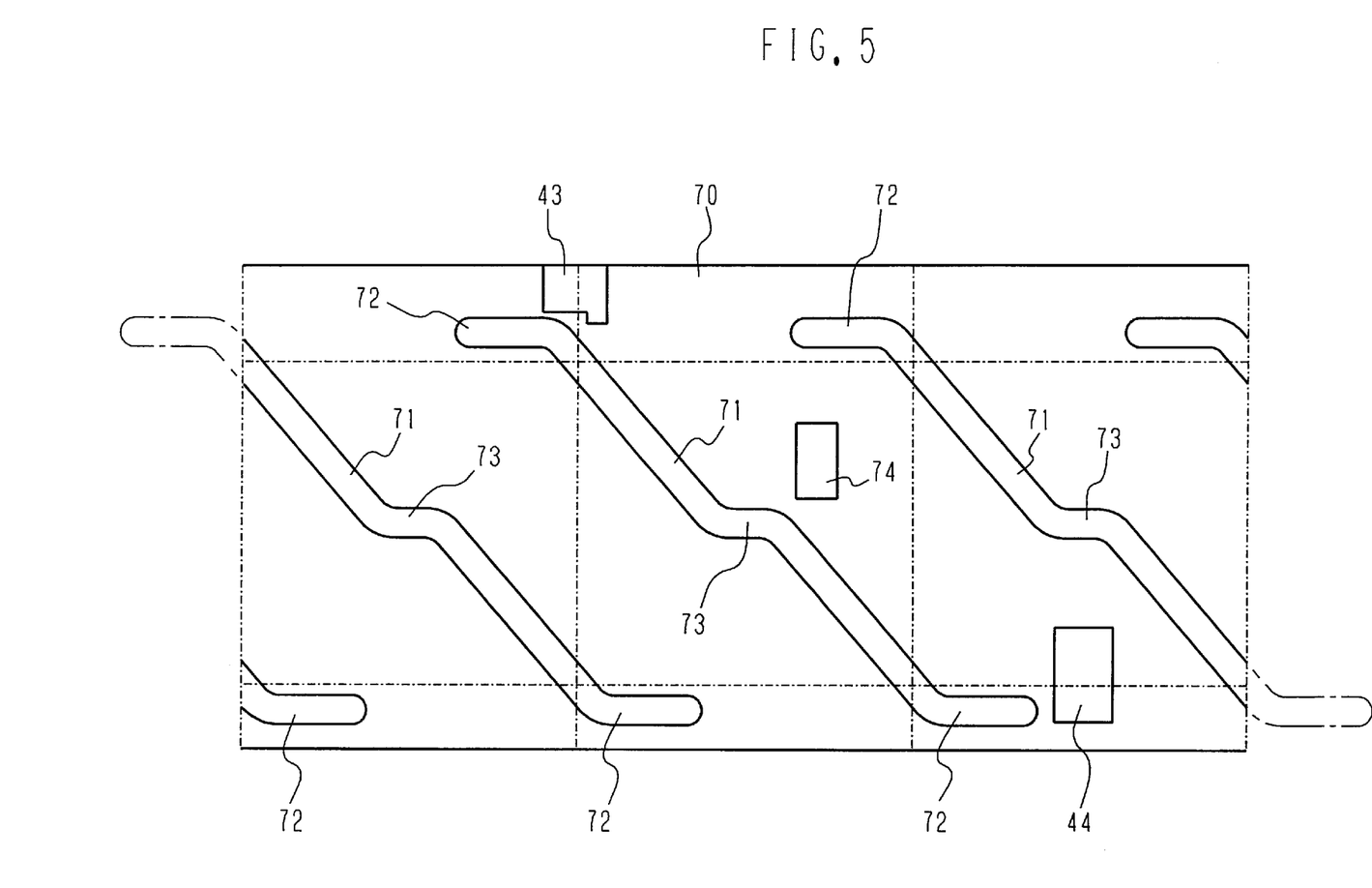
FIG. 5 is a view similar to FIG. 3, illustrating another embodiment of the inventive mechanism adapted to drive a plurality of optical members in an optical apparatus.

While the first embodiment of the invention has been described hereinabove as having insensitive zones 42 formed at longitudinally opposite ends of cam slits 41, respectively, so that the adjustment of iris diaphragm 22 occurs at these forward and backward movement limits for enlarging lens 20, positions of the insensitive zones are not limited to the longitudinally opposite ends of each cam slit 41. An example of such a variant is shown in FIG. 5, in which an insensitive zone 73 is formed midway of each cam slit 71, in addition to a pair of insensitive zones 72 formed at longitudinally opposite ends of cam slit 71, respectively. With such an arrangement, rotation of cylindrical cam 40 is not transmitted to enlarging lens 20 when lens driving pin 27 lies in additional insensitive zone 73, and therefore enlarging lens 20 remains at the position corresponding to additional insensitive zone 73. In operative association with additional insensitive zone 73, an additional diaphragm driving plate 74 is provided at an appropriate position, so that additional diaphragm driving plate 74 may drive diaphragm driving pin 24 and thereby drive iris diaphragm 22 in the direction of iris-in or iris-out as a cylindrical cam 70 is rotated around the optical axis S at this additional insensitive zone 73. According to this embodiment shown in FIG. 5, after diaphragm driving plate 43 comes into engagement with diaphragm driving pin 24 and drives the latter to adjust iris diaphragm 22 to the minimum diaphragm stop, cylinder cam 70 is rotated in the reverse direction. In the course of this rotation, lens driving pins 27 arrive at the respective insensitive zones 73, whereupon diaphragm driving pin 24 is engaged with diaphragm driving plate 74 and drives iris diaphragm 22 in the direction of iris-on to a desired diaphragm stop. Further rotation of cylinder cam 70 causes lens driving pins 27 to leave respective insensitive zones 73, and enlarging lens 22 moves along the optical axis S with iris diaphragm 22 being maintained at the diaphragm stop which has been given by diaphragm driving plate 74. In other words, the diaphragm driving plate 74 may be appropriately dimensioned, configured, and located to obtain a desired diaphragm stop of iris diaphragm 22. For example, by configuring the diaphragm driving plate 74 so that iris diaphragm 22 may be adjusted to an intermediate diaphragm stop between the maximum diaphragm stop and the minimum diaphragm stop thereof, the diaphragm stop of iris diaphragm 22 can be rapidly adjusted.

It is also possible without departing from the scope of the invention to apply the inner surface of cylindrical cam 40 along opposite side edges of each cam slit 41 with friction members serving as position-maintaining means, so that lens driving pins 27 should be moved against a frictional force generated between lens driving pins 27 and the friction members. Additionally, it is possible to provide lens mount 26 with a suitable friction member so that diaphragm driving pin 24 is rotated against a frictional force generated between diaphragm driving pin 24 and the friction member. Such friction members may be formed by rubber, sponge, or other suitable materials. By providing such friction members, iris diaphragm 22 can be reliably maintained at a desired diaphragm stop under the frictional force generated between diaphragm driving pin 24 and the friction member associated therewith, even if a vibration is generated due to forward or backward movement of enlarging lens 20 after iris diaphragm 22 has been adjusted to the desired diaphragm stop.

Figure 6:
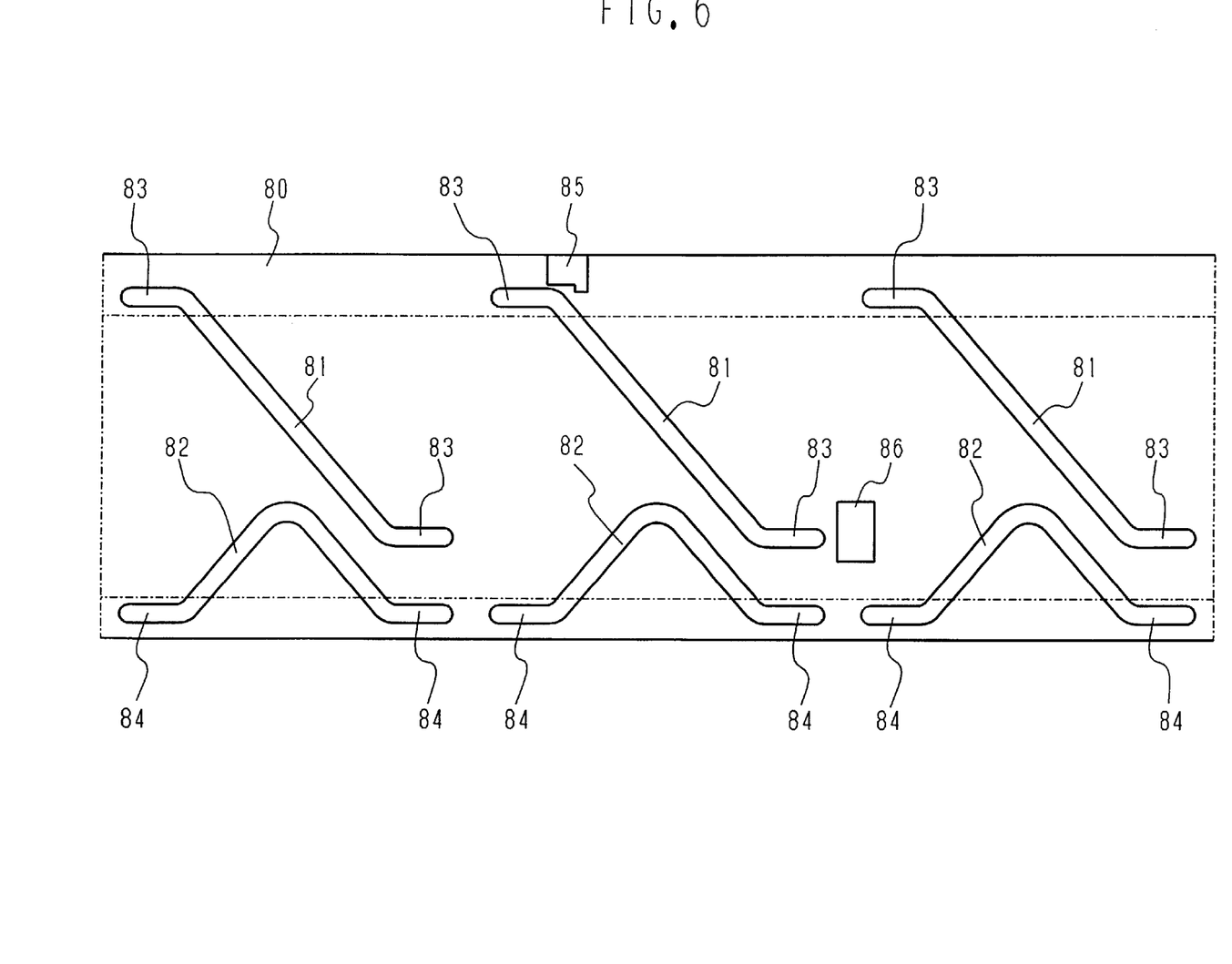
FIG. 6 is a view similar to FIG. 3, illustrating still another embodiment of the inventive mechanism adapted to drive a plurality of optical members in an optical apparatus.

While this embodiment has been described with respect to the case of a single lens arrangement, the mechanism according to the invention is applicable also to the case of a zoom lens system. In the case of the zoom lens system, a cylinder cam 80 is formed with first cam slits 81 and second cam slits 82 to drive two components of the zoom lens system back and forth, respectively, these first cam slits 81 and second cam slits 82 are respectively formed at their appropriate positions with insensitive zones 83, 84, as shown in FIG. 6. There are provided driving plates 85, 86 adjacent insensitive zones 83 of cam slit 81 adapted to drive the component including iris diaphragm 22.

As will be apparent from the foregoing description, the method and mechanism according to the invention for driving the optical members in the optical apparatus allows two different optical members to be driven by a single driving source. This feature allows a compact and light-weight optical apparatus to be realized. Moreover, the number of parts constituting a path for transmission of a driving power can be sufficiently decreased to simplify a construction of the driving mechanism to facilitate work of assembling this and thereby to reduce a cost of the optical apparatus.

When the method and mechanism according to the invention are used to adjust a diaphragm stop and to move the lens back and forth, the lens is moved first to an initial position before the lens is moved to a desired position, then the diaphragm stop can be adjusted in the course of moving the lens from the initial position to the desired position. This unique concept enables the diaphragm as well as the lens to be efficiently driven and facilitates the driving mechanism to be actually incorporated in the optical apparatus.

Furthermore, the driving lens barrel adapted to drive the lens back and forth by its rotation is provided with means for engaging and thereby driving the diaphragm driving pin, and the cam slits formed in driving lens barrel are respectively formed with the insensitive zones. This unique arrangement enables the adjustment of the diaphragm stop as well as forward or backward movement to be reliably achieved.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for driving a lens and a diaphragm in an optical apparatus to achieve a targeted power variation and/or focusing as well as a targeted adjustment of diaphragm stop comprising:

moving the lens back and forth along an optical axis to a first position to obtain a targeted amount of light; and adjusting the diaphragm to a second position to achieve the targeted adjustment of diaphragm stop;

wherein both forward and backward movement of said lens and adjustment of said diaphragm stop are achieved using a single motor.

2. The method for driving a lens and a diaphragm in an optical apparatus according to claim 1, further comprising:

adjusting said diaphragm to the targeted adjustment of diaphragm stop after said lens has been moved back and forth to the first position.

3. The method for driving a lens and a diaphragm in an optical apparatus according to claim 2 and further comprising:

maintaining said lens or diaphragm at their positions with position-maintaining means so that one of said lens and diaphragm can be maintained at its position even when the other is driven after said one has been driven to its position.

4. The method for driving a lens and a diaphragm in an optical apparatus according to claim 1, further comprising:

moving said lens back and forth to the first position after said diaphragm has been adjusted to the targeted adjustment of diaphragm stop.

5. The method for driving a lens and a diaphragm in an optical apparatus according to claim 4 and further comprising:

maintaining said lens or diaphragm at their targeted positions with position-maintaining means so that one of said lens and diaphragm can be maintained at its position even when the other is driven after said one has been driven to its position.

6. The method for driving a lens and a diaphragm in an optical apparatus according to claim 1, further comprising:

adjusting said diaphragm to the targeted adjustment of diaphragm stop while said lens is moved back and forth to the first position.

7. The method for driving a lens and a diaphragm in an optical apparatus according to claim 6 and further comprising:

maintaining said lens or diaphragm at their positions with position-maintaining means so that one of said lens and diaphragm can be maintained at its position even when the other is driven after said one has been driven to its position.

8. The method for driving a lens and a diaphragm in an optical apparatus according to claim 1 and further comprising:

maintaining said lens or diaphragm at their positions with position-maintaining means so that one of said lens and diaphragm can be maintained at its position even when the other is driven after said one has been driven to its position.

9. A method for driving a lens and a diaphragm in an optical apparatus to achieve targeted power variation and/or focusing as well as a targeted adjustment of the diaphragm comprising:

moving the lens back and forth along an optical axis to a first position to obtain a targeted amount of light;

adjusting the diaphragm to a second position to achieve a targeted adjustment of diaphragm stop; and alternatively switching a drive power from a single motor between drive force transmission means for the lens and drive force transmission means for the diaphragm so as to move said lens back and forth and to adjust said diaphragm, respectively.

10. The method for driving a lens and a diaphragm in an optical apparatus according to claim 9, further comprising:

adjusting said diaphragm to the targeted adjustment of diaphragm stop after said lens has been moved back and forth to the first position.

11. The method for driving a lens and a diaphragm in an optical apparatus according to claim 10 and further comprising:

maintaining said lens or diaphragm at their positions with position-maintaining means so that one of said lens and diaphragm can be maintained at its position even when the other is driven after said one has been driven to its position.

12. The method for driving a lens and a diaphragm in an optical apparatus according to claim 9, further comprising:

moving said lens back and forth to the first position after said diaphragm has been adjusted to the targeted adjustment of diaphragm stop.

13. The method for driving a lens and a diaphragm in an optical apparatus according to claim 12 and further comprising:

maintaining said lens or diaphragm at their positions with position-maintaining means so that one of said lens and diaphragm can be maintained at its position even when the other is driven after said one has been driven to its position.

14. The method for driving a lens and a diaphragm in an optical apparatus according to claim 9, further comprising:

adjusting said diaphragm to the targeted adjustment of diaphragm stop while said lens is moved back and forth to the first position.

15. The method for driving a lens and a diaphragm in an optical apparatus according to claim 14 and further comprising:

maintaining said lens or diaphragm at their positions with position-maintaining means so that one of said lens and diaphragm can be maintained at its position even when the other is driven after said one has been driven to its position.

16. The method for driving a lens and a diaphragm in an optical apparatus according to claim 9 and further comprising:

maintaining said lens or diaphragm at their positions with position-maintaining means so that one of said lens and diaphragm can be maintained at its position even when the other is driven after said one has been driven to its position.

17. A method for driving a lens and a diaphragm in an optical apparatus to achieve a targeted power variation and/or focusing as well as a targeted adjustment of the diaphragm by moving said lens back and forth along an optical axis to obtain a targeted amount of light, said method comprising steps of:

transmitting a drive force from a driving source to said lens via drive force transmission means;

arranging said diaphragm so as to be temporarily engageable with said drive force transmission means adapted to transmit a drive force to said lens;

intercepting transmission of a drive force from said drive force transmission means to said lens when said diaphragm comes into engagement with said drive force transmission means in the course of driving said lens;

driving said diaphragm until a diaphragm stop thereof is adjusted to a targeted value; and disengaging said diaphragm from said drive force transmission means so that a drive force may be transmitted again to said lens and thereby said lens may be driven to a targeted position.

18. The method for driving a lens and a diaphragm in an optical apparatus according to claim 17 and further comprising:

maintaining said lens or diaphragm at their positions with position-maintaining means so that one of said lens and diaphragm can be maintained at its position even when the other is driven after said one has been driven to its position.

19. A method for driving a lens and a diaphragm in an optical apparatus to achieve a targeted power variation and/or focussing as well as a targeted adjustment of said diaphragm to obtain a desired amount of light, said method comprising steps of:

rotating a driving lens barrel by transmitting a drive force to said driving lens barrel from a drive source;

moving said lens back and forth along an optical axis and adjusting a diaphragm stop of said diaphragm by rotation of said driving lens barrel;

intercepting transmission of a drive force to said lens after said lens has been moved to a predetermined position by rotation of said driving lens barrel and then switching transmission of a drive force from said driving lens barrel to said diaphragm; and rotating said driving lens barrel in the reverse direction after said diaphragm has been adjusted to a targeted diaphragm stop and thereby moving said lens in the reverse direction until said lens is driven to a targeted position.

20. The method for driving a lens and a diaphragm in an optical apparatus according to claim 19 and further comprising:

maintaining said lens or diaphragm at their positions with position-maintaining means so that one of said lens and diaphragm can be maintained at its position even when the other is driven after said one has been driven to its position.

21. A mechanism for driving optical members in an optical apparatus including a lens adapted to be moved back and forth to a first position by said mechanism for power variation and/or focusing and a diaphragm adapted to be driven to a second position by said mechanism for adjustment of its diaphragm stop, the mechanism comprising:

a single motor adapted to supply a drive force necessary to move said lens back and forth and to adjust the diaphragm stop of said diaphragm.

22. The mechanism for driving optical members in an optical apparatus according to claim 21, wherein said diaphragm is adjusted to a targeted adjustment of diaphragm stop after said lens has been moved back and forth to the first position.

23. The mechanism for driving optical members in an optical apparatus according to claim 22, further comprising position-maintaining means for maintaining said lens or diaphragm at their positions so that one of said lens and diaphragm can be maintained at its position even when the other is driven after said one has been driven to its position.

24. The mechanism for driving optical members in an optical apparatus according to claim 21, wherein said lens is moved back and forth to the first position after said diaphragm has been adjusted to the targeted adjustment of diaphragm stop.

25. The mechanism for driving optical members in an optical apparatus according to claim 24, further comprising position-maintaining means for maintaining said lens or diaphragm at their positions so that one of said lens and diaphragm can be maintained at its position even when the other is driven after said one has been driven to its position.

26. The mechanism for driving optical members in an optical apparatus according to claim 21, wherein said diaphragm is adjusted to the targeted adjustment of diaphragm stop while said lens is moved back and forth to the first position.

27. The mechanism for driving optical members in an optical apparatus according to claim 26, further comprising position-maintaining means for maintaining said lens or diaphragm at their positions so that one of said lens and diaphragm can be maintained at its position even when the other is driven after said one has been driven to its position.

28. The mechanism for driving optical members in an optical apparatus according to claim 21, further comprising position-maintaining means for maintaining said lens or diaphragm at their positions so that one of said lens and diaphragm can be maintained at its position even when the other is driven after said one has been driven to its position.

29. A mechanism for driving optical members in an optical apparatus including a lens adapted to be moved back and forth to a first position by said mechanism for power variation and/or focussing and a diaphragm adapted to be driven to a second position by said mechanism for adjustment of its diaphragm stop, the mechanism comprising:

a single motor;

drive force transmission means for the lens; and drive force transmission means for the diaphragm;

wherein transmission of a drive force from the single motor is switched with appropriate timing between said drive force transmission means for the lens and said drive force transmission means for the diaphragm to move said lens back and forth and to adjust the diaphragm stop of said diaphragm, respectively.

30. The mechanism for driving optical members in an optical apparatus according to claim 29, wherein said diaphragm is adjusted to a targeted adjustment of diaphragm stop after said lens has been moved back and forth to the first position.

31. The mechanism for driving optical members in an optical apparatus according to claim 30, further comprising position-maintaining means for maintaining said lens or diaphragm at their positions so that one of said lens and diaphragm can be maintained at its position even when the other is driven after said one has been driven to its position.

32. The mechanism for driving optical members in an optical apparatus according to claim 29, wherein said lens is moved back and forth to a the first position after said diaphragm has been adjusted to the targeted adjustment of diaphragm stop.

33. The mechanism for driving optical members in an optical apparatus according to claim 32, further comprising position-maintaining means for maintaining said lens or diaphragm at their positions so that one of said lens and diaphragm can be maintained at its position even when the other is driven after said one has been driven to its position.

34. The mechanism for driving optical members in an optical apparatus according to claim 29, wherein said diaphragm is adjusted to a targeted adjustment of diaphragm stop while said lens is moved back and forth to the first position.

35. The mechanism for driving optical members in an optical apparatus according to claim 34, further comprising position-maintaining means for maintaining said lens or diaphragm at their positions so that one of said lens and diaphragm can be maintained at its position even when the other is driven after said one has been driven to its position.

36. The mechanism for driving optical members in an optical apparatus according to claim 29, further comprising position-maintaining means for maintaining said lens or diaphragm at their positions so that one of said lens and diaphragm can be maintained at its position even when the other is driven after said one has been driven to its position.

37. A mechanism for driving optical members in an optical apparatus including a lens adapted to be moved back and forth to a first position by said mechanism for power variation and/or focussing and a diaphragm adapted to be driven to a second position by said mechanism for adjustment of its diaphragm stop, said mechanism comprising:

a drive source supplying a drive force to said lens and diaphragm;

drive force transmission means for transmitting a drive force from said drive source to said lens; and clutch means mounted on said drive force transmission means so as to be temporarily engageable with said diaphragm, wherein said clutch means is in engagement with said diaphragm to drive said diaphragm, said clutch means is engaged with said diaphragm when said lens has been driven to a predetermined position and said clutch means being out of engagement with said diaphragm unless said lens lies at said predetermined position, and transmission of a drive force from said drive source transmission means to said lens is intercepted when said clutch means is in engagement with said diaphragm.

38. The mechanism for driving optical members in an optical apparatus according to claim 37, wherein said diaphragm is adjusted to a targeted adjustment of diaphragm stop after said lens has been moved back and forth to the first position.

39. The mechanism for driving optical members in an optical apparatus according to claim 38, further comprising position-maintaining means for maintaining said lens or diaphragm at their positions so that one of said lens and diaphragm can be maintained at its position even when the other is driven after said one has been driven to its position.

40. The mechanism for driving optical members in an optical apparatus according to claim 37, wherein said lens is moved back and forth to a the first position after said diaphragm has been adjusted to a targeted adjustment of diaphragm stop.

41. The mechanism for driving optical members in an optical apparatus according to claim 40, further comprising position-maintaining means for maintaining said lens or diaphragm at their positions so that one of said lens and diaphragm can be maintained at its position even when the other is driven after said one has been driven to its position.

42. The mechanism for driving optical members in an optical apparatus according to claim 37, wherein said diaphragm is adjusted to a targeted adjustment of diaphragm stop while said lens is moved back and forth to the first position.

43. The mechanism for driving optical members in an optical apparatus according to claim 42, further comprising position-maintaining means for maintaining said lens or diaphragm at their positions so that one of said lens and diaphragm can be maintained at its position even when the other is driven after said one has been driven to its position.

44. The mechanism for driving optical members in an optical apparatus according to claim 37, further comprising position-maintaining means for maintaining said lens or diaphragm at their positions so that one of said lens and diaphragm can be maintained at its position even when the other is driven after said one has been driven to its position.

45. A mechanism for driving optical members in an optical apparatus including a lens adapted to be moved back and forth to a first position by said mechanism for power variation and/or focussing and a diaphragm adapted to be driven to a second position by said mechanism for adjustment of its diaphragm stop, said mechanism comprising:

a lens barrel containing therein said lens and said diaphragm being moved back and forth together with said lens;

a driving lens barrel provided within said lens barrel so as to be rotatable around an optical axis;

clutch means mounted on an inner peripheral surface of said driving lens barrel at predetermined positions so that said clutch means may be engaged with or disengaged from drive input means for said diaphragm as said driving lens barrel is rotated;

cam slits formed on said driving lens barrel so as to be operatively associated with drive input means for the lens;

cam means provided on said lens barrel so as to be operatively associated with said drive input means for the lens; and a drive source for rotating said driving lens barrel, wherein said cam slits and said cam means are configured so that said lens may be moved back and forth along an optical axis over a predetermined distance as said driving lens barrel is rotated, and said cam slits are provided with insensitive zones in which said lens is not moved back and forth even if said driving lens barrel is rotated so that said clutch means comes into engagement with said drive input means for said diaphragm to drive said diaphragm in the direction of iris-in or iris-out when said drive input means for said lens lies in said insensitive zones.

46. The mechanism for driving optical members in an optical apparatus according to claim 45, wherein said insensitive zones are provided in the proximity of a forward movement limit for said lens as well as a backward movement limit for said lens.

47. The mechanism for driving optical members in an optical apparatus according to claim 46, further comprising position-maintaining means for maintaining said lens or diaphragm at their positions so that one of said lens and diaphragm can be maintained at its position even when the other is driven after said one has been driven to its position.

48. The mechanism for driving optical members in an optical apparatus according to claim 45, further comprising position-maintaining means for maintaining said lens or diaphragm at their positions so that one of said lens and diaphragm can be maintained at its position even when the other is driven after said one has been driven to its position.

* * * * *